Jan. 19, 1971  B. R. ODELL  3,555,919
COMBINED MARINE BOX

Filed Sept. 11, 1968  2 Sheets-Sheet 2

INVENTOR.
BENJAMIN ROBERTO ODELL
BY
his ATTORNEYS

United States Patent Office 3,555,919
Patented Jan. 19, 1971

3,555,919
COMBINED MARINE BOX
Benjamin R. Odell, Buenos Aires, Argentina, assignor to Tuman S.C.A., Buenos Aires, Argentina, a corporation of Argentina
Filed Sept. 11, 1968, Ser. No. 759,016
Claims priority, application Argentina, Sept. 13, 1967, 209,711
Int. Cl. F16d 11/06, 13/04; F16h 3/14
U.S. Cl. 74—355                                    4 Claims

ABSTRACT OF THE DISCLOSURE

A transmission for marine use comprises offset input and output shafts, forward and reverse gear trains having output gears which are journaled to the output shaft, and an electromagnetic clutch associated with each gear train. Each clutch includes a coil spring fastened to the respective output gear, a knurled clutch sleeve affixed to the output shaft, and an electromagnetic coil, which upon energization constricts and locks the coil spring to the clutch sleeve so that the rotation of the respective output gear is transmitted to the output shaft.

---

Figure 1:
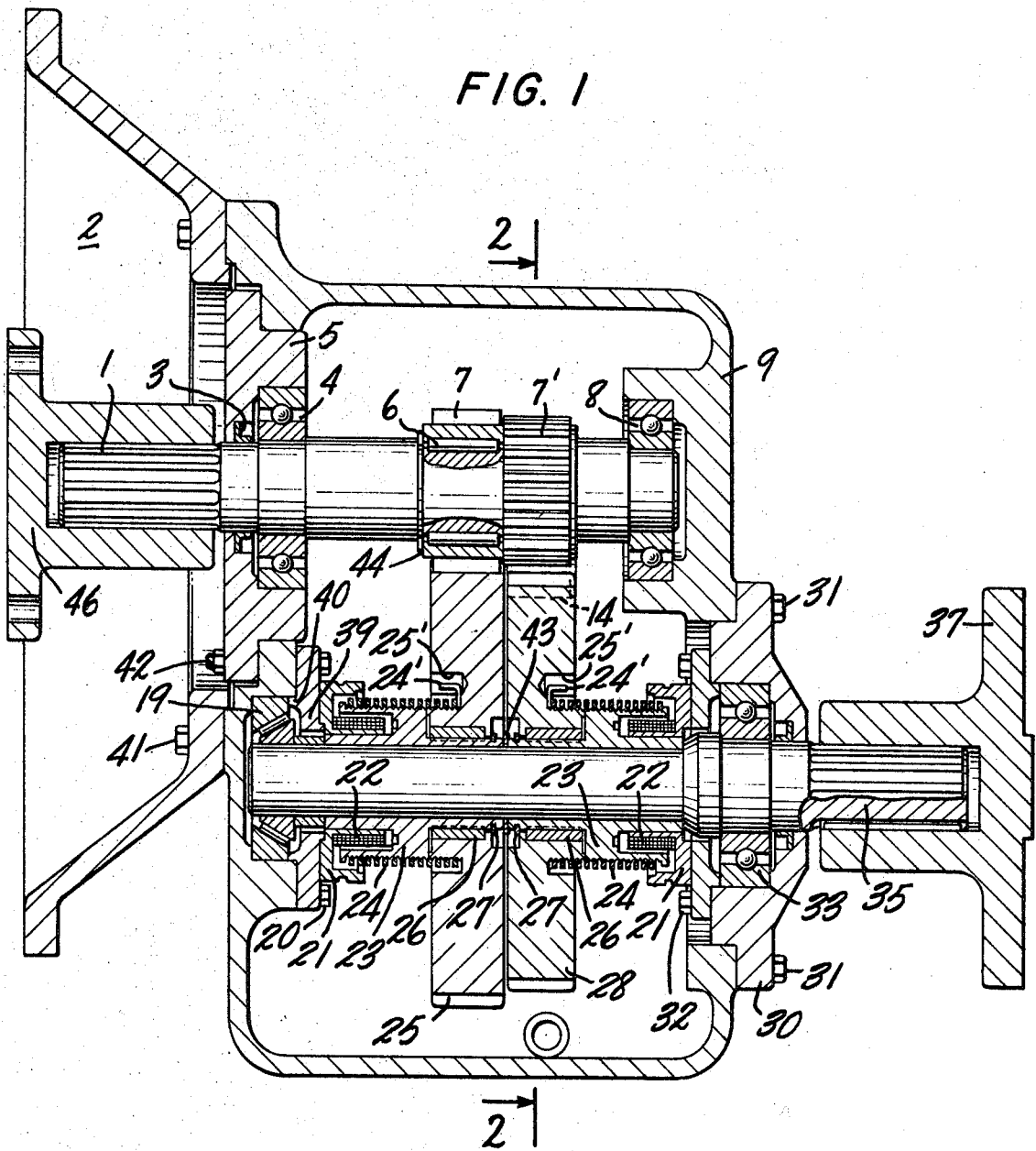

The purpose of this invention is to provide a combined marine case. It specially refers to a gear case for vessels, that allows for reversing operation and reduction of speed.

There are known a great number of kinds of marine case constructions that allow for reverse operation, making use generally of systems of planetary gears and double clutches, hydraulic or mechanical. Both the initial cost as well as the maintainment cost of these transmissions is high; this system making them besides very bulky as well as heavy. The control of the clutches moreover requires complicated transmissions. Other marine gear cases make use of the system as employed in the speed boxes of terrestrial installations, particularly of the type as employed in motor vehicles, with displaceable gears, the adaptation of which to naval purposes is not always possible, without being obliged to conform to great inconveniences. The marine cases for reverse running must, besides, be supplemented with another reduction case, an additional case, that allows for the reduction of speed of the propeller shaft, this requiring a greater cost, volume and weight.

An advantage of this invention is that the marine case is of minimum dimensions and weight for a certain motive power to be transmitted; it has its shaft axes, incoming and outgoing, substantially separated and this allows the motor to be located at a rather more elevated position than in the case in which the axis of the input shaft and that of the output shaft be coaxial; consequently the inclination of the motor will be less, the propeller shaft will be nearer the bottom of the vessel, and it will be possible even to place the output shaft not directly under the input shaft, but in another radial position. The gear case allows rotation of the wheel cover, this being a special advantage in the case of the installation of two motive units, functioning without lengthening it nor additions as a speed reducing case. All this may be obtained thanks to the employment of coil choking clutches of the logarithmic kind operated by an annular electromagnet, this having the additional advantage that the control coupling to the control bridge is made with a simple cabling of easy locating and placing.

The range of this invention is determined by the following definition:

There is provided in accordance with the invention, a transmission for marine use having offset input and output shafts. Two speed-reducing gear trains connect the input and output shafts, one of the trains including, in addition, an idler gear for reverse operation; however, the output gears, which are coaxial with the output shaft, are not affixed to the output shaft, but are journaled for rotation with respect to the shaft.

A pair of electromagnetic clutch assemblies are provided, one associated with each gear train, including in each assembly a knurled clutch sleeve, a helical coil spring, and an electromagnetic coil. Each clutch sleeve is coaxially carried by and keyed to the output shaft adjacent the associated output gear. The clutch coil spring is fastened at one end to the associated output gear and extends coaxially around the clutch sleeve. Upon energization of the clutch electromagnetic coil, which is installed coaxially in an annular cavity in the clutch sleeve, the spring constricts and locks to the clutch sleeve, thereby to transmit rotational movement of the respective output gear to the output shaft. The actuating contacts for the clutches are interlocked so that only one clutch may be energized at a time. Selective operation of the electromagnetic clutch thus provides a relatively efficient and simple means of changing the drive ratios and direction in a marine transmission.

In order to explain with more detail the nature of this invention and the manner in which same may be carried out, in the following description and with the help of the annexed drawings, an indicative manner of realization will be described. It should be taken into account, however, that the manner of realization selected for the invention, as described or illustrated, does not restrict its range, that is the one as above stated and amplified in the claims following this descriptive statement.

Figure 2:
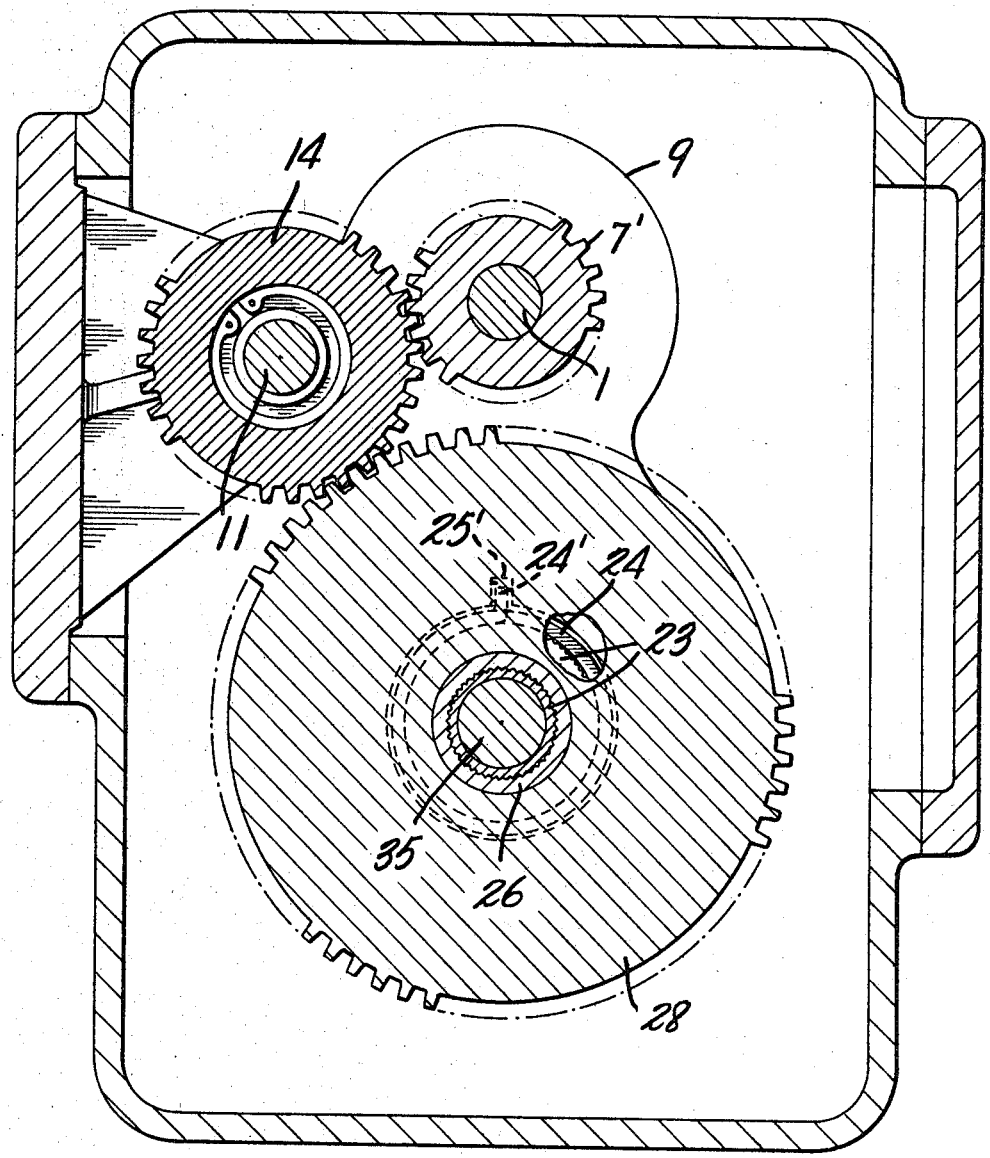

In the drawings annexed, in which the same numbers of reference correspond to the same or similar parts:

FIG. 1 is a cross section, made with a plane containing the geometrical axis of the input shaft and of the output shaft of the marine case constructed according to this invention, and FIG. 2 is a section of the same case according to the tracing plane 2—2 as stated in FIG. 1.

As it may be seen in FIG. 1, the case 9 is fixed with screws 41 (schematically shown) on a wheelcover 2, of a marine motor, not illustrated, the motive shaft of which is coaxial with shaft 1 and united to same through the shaft coupling 46. The shaft 1 rests on the case 9 through the bearings 8, in the rear part, and 4, the latter being fixed to the inlet flange 5, which is provided with the retainer 3 and fixed to the case 9 through the screws 42. On the axis 1, the gears 7 and 7' are fixed by keys or pins 6 and rings 44 of the Seeger type.

Parallel to the input shaft 1, the case 9 presents an output shaft 35, that has a projecting end being fixed to a coupling 37 that allows its coupling to the propeller shaft of the vessel (not illustrated). Said end of the shaft 35 goes through an outlet bushing 30, which is fixed to the case 9 through screws 31 and which also retain a bearing 33. The front end of the shaft 35 rests on a bearing 19, located on the case 9. The bearings 33 and 19 are being retained in their places through bushings 39; the one corresponding to the bearing 19 is fixed on the case 9 through the screws 20, while the one corresponding to the bearing 33, is fixed to the bushing 30 through screws 32. A pair of electromagnetic coil holders 21 are fixed to the bushing 39 through the screws 32 and 20. The coil holders 21 are of annular form and locate in their interior an electromagnetic coil 22 respectively, in such a manner that those remain in the annular channel of a pair of clutch sleeves 23. Each clutch sleeve 23, in its other end, presents a tubular part, on which a sleeve bearing 26 and a Seeger ring 27 are mounted, serving, respectively, as bearing and fastener for the gears (25 and 28) that we shall describe in the following description. The periphery of each clutch sleeve 23 is knurled and on it a steel helical spring 24 is disposed. The interior diameter of the spring 24 is slightly larger than the diameter of the knurled part of the clutch sleeve 23. The clutch sleeves 23 are affixed to the shaft 35 and their ends, one in front of the other, are separated through a washer 43. The springs 24 are not locked to the respective clutch sleeves 23, with the exception when current is circulated through the coils 22, in which case, the magnetic flux constricts or draws the spring 24 to the clutch sleeve 23, this union being increased by the knurling and the well known effect of helicoidal logarithmic throttling, so that the clutch sleeve 23 and coil spring 24 form a unit. The end( the one most distant from the coil 22) of the coil spring 24 presents a doubled-up portion 24' located in a groove 25' existing in the gears 25 and 28. These gears 25 and 28 are mounted on the shafts 35, in such a manner that they may rotate in a loose manner around the sleeves or busings 26, taking with them, when rotating, the respective helical coil springs 24, thanks to the doubled up portion 24', located in the groove 25'. It is easy to see that in case the corresponding coil 22 has no electrical current going through it, the gears 25 and 28 will rotate around the shaft 35 independently from the rotation of the latter, but that, in case one of the coils be enerized, owing to the fact that electrical curcent circulates through it, the springs 24 that correspond will become united with the clutch sleeve 23. Since the clutch sleeve 23 is affixed to the shaft 35, the latter will be obliged to rotate in the same sense.

The gear 25 is meshed in a permanent manner with the gear 7, as FIG. 1 allows to see, in the same FIG. 2, it may be seen that the gear 26 is not geared with the gear 7', but in FIG. 2 it may be seen that the gear 28 as well as the gear 7' are meshed with the gear 14 mounted on a shaft 11, the latter being parallel to the shafts 1 and 35. We shall not refer in detail to the fixation of the shaft 11 to the case 9, nor to the gear 14 on said shaft 11, as they are well known by the experts of this line. It is readily apparent to one skilled in the art that the output gears 25 and 28 rotate at a reduced speed relative to the rotation of the input gears 7 and 7', and that the gears 25 and 28 rotate in mutually opposite directions due to the interposition of the idler gear 14 between the gears 7' and 28.

The operation of the transmission assembly is described with reference to a marine installation. The wheelcover 2 being coupled with a motor of a vessel in such a manner that the shaft 35 is aligned with the shaft of the propeller of said vessel. Once the necessary connection be made, the only thing to be done, in order that the propeller of the vessel rotate in one direction is energizing the electromagnetic coil 22 located in the clutch sleeve 23 that serves as a bearing to the gear 25. Due to the magnetism developed by the coil 23, the respective spirals of the spring 24 are locked with the clutch sleeve 23, in this manner obtaining the union of the elements 35-23-24-25. During that time, the gear 28 (that, due to the fact of being indirectly coupled to the axis 1, rotates in the opposite sense as to the gear 25), rotates loosely around the sleeve 26 that pertains to it, and the helical coil spring 24 that is attached to the gear 28 rotates with respect to the knurled surface of the corresponding clutch sleeve 23, as there is no magnetism uniting both, as the coil 22 has not become energized. An electrical switch or contact is provided for each coil 22 operating the forward and reverse clutches respectively. To provide simultaneous energization of both the forward and reverse clutches, the electrical contacts provided for each clutch may be interlocked by any of the methods commonly known to those skilled in the art.

It is easy to see that a great number of accessories may be added (some of them being illustrated but not described) and modifications made in the example of realization as described and illustrated. For example, the gears 7 and 7' may be of the same number of teeth as gears 25 and 28 in which case, the transmission instead of being a reducer of speed, as it actually is in the example illustrated, would simply be a reversing mechanism. Therefore, the invention is to be construed as including all the embodiments thereof in the scope of the appended claims.

Having determined the nature of this invention and the manner in which same may be used in practice, we beg to state as being our exclusive property:

1. A marine transmission for forward and reverse operation, comprising: an input shaft; an output shaft; a first gear train, including a first input gear carried by and coaxial with said input shaft, and a first output gear coaxial with said output shaft and meshing with said input gear; a second gear train including a second input gear carried by and coaxial with said input shaft, a second output gear coaxial with said output shaft, and an idler shaft and gear adapted to mesh with both said second input and output gears; bearing means for rotatably mounting said first and second output gears on said output shaft; first and second clutch sleeves coaxial with said output shaft and rotatable therewith, said first clutch sleeve being located adjacent said first output gear and said second clutch sleeve being located adjacent said second output gear; first and second helical coil springs coaxial around said first and second clutch sleeves respectively; means for attaching one end of each of said first and second helical coil springs to said first and second output gears respectively; first and second means for selectively generating a magnetomotive force effective to constrict and lock said first and second coil springs to their respective clutch sleeves so that excitation of said first means for generating a magnetomotive force causes said output shaft to be driven by said input shaft through said first gear train and excitation of said second means for generating a magnetomotive force causes said output shaft to be driven by said input shaft through said second gear train.

2. A marine transmission according to claim 1, wherein the exterior diameters of said first and second clutch sleeves are in clearance relation to the interior diameters of their respective coil springs when said springs are in relaxed condition, and wherein at least a portion of the surface of each clutch sleeve which locks with said coil springs is knurled.

3. A marine transmission according to claim 1, wherein said first and second input gears and said first and second output gears have the same number of teeth.

4. A marine transmission according to claim 1, wherein said first and second input gears have a lesser number of teeth than said first and second output gears.

References Cited

UNITED STATES PATENTS

| | | | |
|---|---|---|---|
| 2,622,450 | 12/1952 | Gorske et al. | 192—41(S)X |
| 2,727,402 | 12/1955 | Thoresen | 74—355X |
| 2,798,581 | 7/1957 | Supitilov | 74—355X |
| 3,177,995 | 4/1965 | Mason | 192—35 |
| 3,216,392 | 11/1965 | Shimanckas | 192—41(S) |

LEONARD H. GERIN, Primary Examiner

U.S. Cl. X.R.

192—35, 41